US010253783B2

(12) United States Patent
Drechsel et al.

(10) Patent No.: US 10,253,783 B2
(45) Date of Patent: Apr. 9, 2019

(54) PUMP ARRANGEMENT COMPRISING A PLAIN BEARING ARRANGEMENT

(71) Applicant: KSB Aktiengesellschaft, Frankenthal (DE)

(72) Inventors: Patrick Drechsel, Frankenthal (DE); Markus Lay, Pegnitz (DE)

(73) Assignee: KSB Aktiengesellschaft, Frankenthal (DE)

( * ) Notice: Subject to any disclaimer, the term of this patent is extended or adjusted under 35 U.S.C. 154(b) by 378 days.

(21) Appl. No.: 14/889,698

(22) PCT Filed: Apr. 29, 2014

(86) PCT No.: PCT/EP2014/058669
§ 371 (c)(1),
(2) Date: Nov. 6, 2015

(87) PCT Pub. No.: WO2014/180705
PCT Pub. Date: Nov. 13, 2014

(65) Prior Publication Data
US 2016/0084258 A1    Mar. 24, 2016

(30) Foreign Application Priority Data

May 8, 2013    (DE) .......................... 10 2013 208 460

(51) Int. Cl.
*F04D 29/046*    (2006.01)
*F04D 13/06*    (2006.01)
(Continued)

(52) U.S. Cl.
CPC ....... *F04D 29/046* (2013.01); *F04D 13/0633* (2013.01); *F04D 29/0413* (2013.01);
(Continued)

(58) Field of Classification Search
CPC ............... F04D 13/0633; F04D 29/046; F04D 29/0462; F04D 29/047; F04D 29/0473;
(Continued)

(56) References Cited

U.S. PATENT DOCUMENTS 2,999,704 A    9/1961 Haller et al.
3,830,597 A *  8/1974 Donahue ................ F02M 55/04
                                                     417/462
(Continued)

FOREIGN PATENT DOCUMENTS

CA    2 736 810 A1    3/2010
DE    19541247 A1    5/1997
(Continued)

OTHER PUBLICATIONS

International Search Report (PCT/ISA/210) issued in PCT Application No. PCT/EP2014/058669 dated Jul. 29, 2014 with English translation (Six (6) pages).
(Continued)

Primary Examiner — Carlos A Rivera
Assistant Examiner — Justin A Pruitt
(74) *Attorney, Agent, or Firm* — Crowell & Moring LLP

(57) ABSTRACT

A pump arrangement, in particular a magnetic clutch pump arrangement, is provided. The pump arrangement includes a pump housing containing an impeller shaft, an impeller, a casing cover adjacent to the impeller and supporting a plain bearing arrangement. The pump arrangement also includes a containment shell which seals an enclosed chamber within the inner chamber of the pump housing. The plain bearing arrangement includes first and second bearing sleeves connected to the impeller shaft, a first bearing bush which cooperates with the first bearing sleeve via a radial bearing surface and is connected to the pump housing or to a component secured to the pump housing a second bearing (Continued)

bush which cooperates with the second bearing sleeve via a radial bearing surface and is connected to the pump housing or to a component secured to the pump housing, and a retainer ring mounted between the first and second bearing sleeves. The retainer ring has, in the end surface facing the first bearing bush a first annular groove which receives a first axial bearing ring, and in the end surface facing the second bearing bush a second annular groove which receives a second axial bearing ring.

5 Claims, 2 Drawing Sheets

(51) Int. Cl.
  *F04D 29/047* (2006.01)
  *F04D 29/041* (2006.01)
  *F16C 33/08* (2006.01)
  *F04D 29/06* (2006.01)
(52) U.S. Cl.
  CPC .......... *F04D 29/0473* (2013.01); *F16C 33/08* (2013.01); *F04D 29/061* (2013.01)
(58) Field of Classification Search
  CPC .... F04D 29/05; F04D 29/056; F04D 29/0563; F04D 29/057; F04D 29/0413; F04D 29/04; F04D 29/041; F16C 33/08
  USPC ......... 384/91, 129, 275, 276, 281–291, 901, 384/904; 415/111
  See application file for complete search history.

(56) References Cited

U.S. PATENT DOCUMENTS

| | | | | |
|---|---|---|---|---|
| 5,580,216 A | * | 12/1996 | Munsch | F04D 29/0413 415/122.1 |
| 2006/0245955 A1 | * | 11/2006 | Horiuchi | F04D 13/026 417/420 |
| 2008/0213087 A1 | * | 9/2008 | Wagner | F04D 29/0413 415/182.1 |
| 2012/0068565 A1 | | 3/2012 | Pfeil et al. | |

FOREIGN PATENT DOCUMENTS

| | | |
|---|---|---|
| DE | 20 2009 004 160 U1 | 7/2009 |
| EP | 0 771 956 A1 | 5/1997 |
| GB | 2 274 683 A | 8/1994 |
| JP | 2012-520431 A | 9/2012 |
| WO | WO 2010/108603 A1 | 9/2010 |

OTHER PUBLICATIONS

German-language Office Action issued in counterpart German Application No. 10 2013 208 460.9 dated Jul. 29, 2015 (Five (5) pages).
English translation of International Preliminary Report on Patentability ( PCT/IB/373) including Written Opinion (PCT/ISA/237) issued in PCT Application No. PCT/EP2014/058669 dated Nov. 10, 2015 (eight pages).
English-language Office Action issued in counterpart Singapore Application No. 11201508891X dated Feb. 27, 2017 (7 pages).
English translation only, Japanese Office Action issued in counterpart Application No. 2016-512286 dated Jan. 30, 2018 (two (2) pages).

* cited by examiner

PUMP ARRANGEMENT COMPRISING A PLAIN BEARING ARRANGEMENT

CROSS REFERENCE TO RELATED APPLICATIONS

This application is a continuation of PCT International Application No. PCT/EP2014/058669, filed Apr. 29, 2014, which claims priority under 35 U.S.C. § 119 from German Patent Application No. 10 2013 208 460.9, filed May 8, 2013, the entire disclosures of which are herein expressly incorporated by reference.

BACKGROUND AND SUMMARY OF THE INVENTION

The invention relates to a pump arrangement, in particular a magnetic clutch pump arrangement.

The pump arrangement has an interior space formed by a pump casing, a containment can which hermetically seals off a chamber surrounded by said containment can with respect to the interior space formed by the pump casing, an impeller shaft which is mounted by way of a plain bearing arrangement and which can be driven in rotation about an axis of rotation, having an impeller arranged on one end of the impeller shaft, a first bearing sleeve connected non-rotationally to the impeller shaft, a second bearing sleeve connected non-rotationally to the impeller shaft, a first bearing bushing which interacts by way of a radial bearing surface with the first bearing sleeve and which is connected non-rotationally to the pump casing or to a component fastened to the pump casing, a second bearing bushing which interacts by way of a radial bearing surface with the second bearing sleeve and which is connected non-rotationally to the pump casing or to a component fastened to the pump casing, and a retaining ring arranged between the first and second bearing bushings.

European patent document no. EP 0 771 956 A1 has disclosed a magnetic clutch pump of said type with a plain bearing arrangement, in the case of which the static bearing parts are received in a bearing ring carrier, referred to as outer casing, and the bearing parts which rotate about the axis of rotation are positioned on the shaft. Here, the axial bearings are each assigned a static bearing part from the outside. This has the disadvantage that the impeller and the bearing bushing arranged closest to the impeller are spaced apart to a relatively great extent, and thus there is a relatively large spacing between said bearing bushing and the radial force that arises at the impeller. Furthermore, an exchange of the static bearing parts is possible only with great outlay and using special tools.

It is the object of the invention to further develop a generic pump arrangement such that the lubrication of the axial bearing is further improved, the radial bearing forces under given loads are reduced, and ease of servicing is increased.

The object of the invention is achieved in that a first ring groove, which receives a first axial bearing ring, is formed in the retaining ring on the face side facing toward the first bearing bushing, and a second ring groove, which receives a second axial bearing ring, is formed in the retaining ring on the face side facing toward the second bearing bushing.

Owing to the positioning of the axial bearing rings between the first and second bearing bushings, the lubrication and cooling of the axial bearing arrangements thus formed is optimized in relation to the prior art. Likewise, the two axial bearing arrangements are thus situated at a position with the least shaft bending, whereby axial bearing tilting is reduced in relation to the prior art, and the contact ratio is increased.

In an advantageous refinement, the first bearing sleeve and the first bearing bushing are arranged in an opening of the casing cover.

In this way, it is possible for the first bearing sleeve and first bearing bushing to be positioned closer to the impeller, whereby the radial forces in the bearing can be reduced, and a lower likelihood of bearing failure at operating points that are critical with regard to radial thrust is realized.

To achieve secure seating of the axial bearing rings, it is provided, in a preferred refinement of the invention, that the first axial bearing ring is clamped in the first ring groove by way of an undular washer, and the second axial bearing ring is clamped in the second ring groove by way of an undular washer.

In a preferred refinement of the invention, for optimum lubrication and cooling of the plain bearing arrangement, it is provided that, in the retaining ring, there is formed at least one bore which connects the first ring groove to a further ring groove formed in the retaining ring in a region facing toward the impeller shaft.

For the same reason, according to the invention, in the retaining ring, there is formed at least one bore which connects the second ring groove to the ring groove formed in the retaining ring in the region facing toward the impeller shaft.

For simple and inexpensive assembly, in an advantageous refinement of the invention, an opening in a casing cover of the pump casing has an opening region of increased diameter, in which opening region there is formed an encircling groove which receives a tolerance ring, and in which opening region the first bearing bushing is positioned and connected non-rotationally to the casing cover by way of the tolerance ring.

Furthermore, it is expediently the case that an opening in the bearing ring carrier has an opening region of increased diameter, in which opening region there is formed an encircling groove which receives a tolerance ring, and in which opening region the second bearing bushing is accommodated and connected non-rotationally to the bearing ring carrier by way of the tolerance ring.

An arrangement of the first bearing bushing in the casing cover and of the second bearing bushing in the bearing ring carrier has the advantage that the plain bearing arrangement or parts thereof can be exchanged in an easy manner with regard to servicing, without the use of special tools.

Other objects, advantages and novel features of the present invention will become apparent from the following detailed description of one or more preferred embodiments when considered in conjunction with the accompanying drawings.

DETAILED DESCRIPTION

Figure 1:
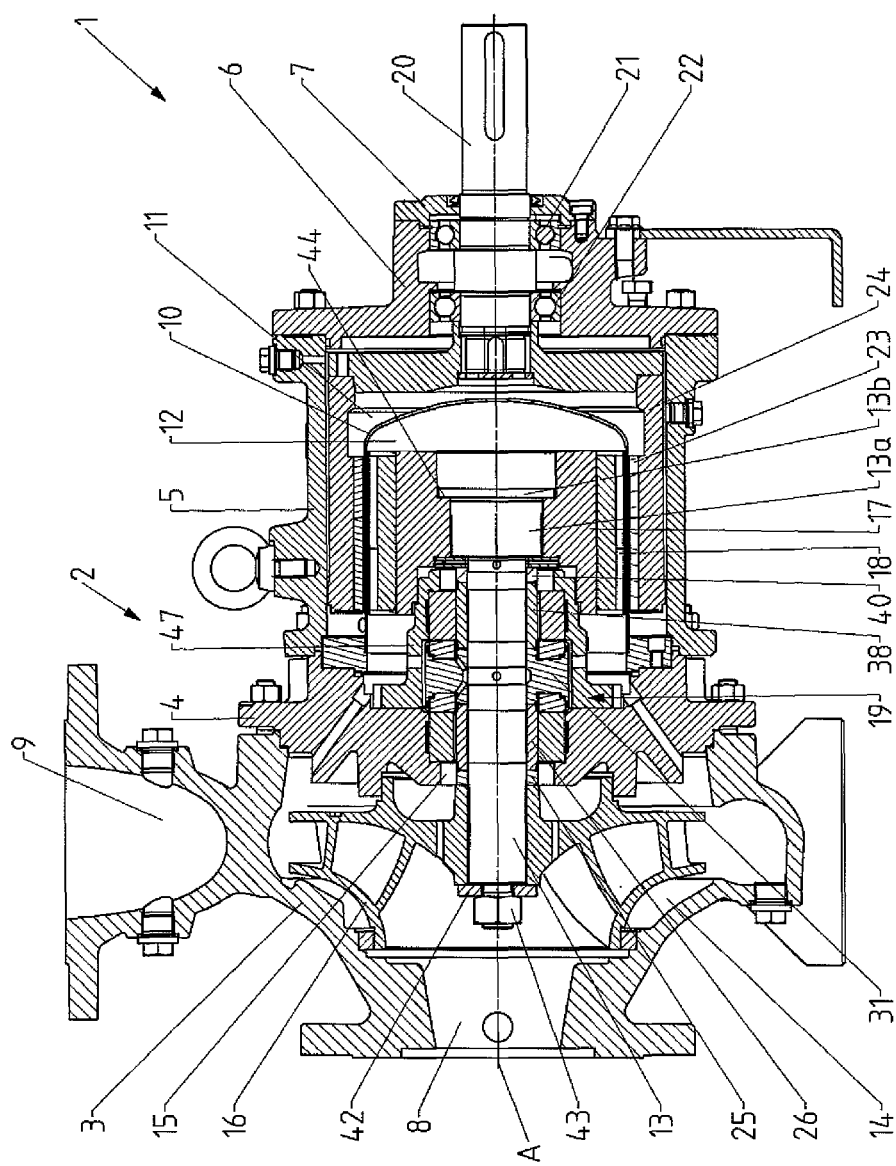
FIG. 1 shows a longitudinal section through a magnetic clutch pump arrangement having a plain bearing arrangement according to an embodiment of the invention.

FIG. 1 shows a pump arrangement 1 in the form of a magnetic clutch pump arrangement. The pump arrangement 1 has a multi-part pump casing 2 of a centrifugal pump, which pump casing comprises a hydraulics casing 3 in the form of a spiral casing, a casing cover 4, a bearing carrier cage 5, a bearing carrier 6 and a bearing cover 7.

The hydraulics casing 3 has an inlet opening 8 for the intake of a delivery medium and has an outlet opening 9 for the discharge of the delivery medium. The casing cover 4 is arranged on that side of the hydraulics casing 3 which is situated opposite the inlet opening 8. The bearing carrier cage 5 is fastened to that side of the casing cover 4 which is opposite from the hydraulics casing 3. The bearing carrier 6 is mounted on that side of the bearing carrier cage 5 which is situated opposite the casing cover 4. The bearing cover 7 in turn is fastened to that side of the bearing carrier 6 which is opposite from the bearing carrier cage 5.

A containment can 10 is fastened to that side of the casing cover 4 which is opposite from the hydraulics casing 3, and said containment can extends at least partially through an interior space 11 delimited by the pump casing 2, in particular by the casing cover 4, by the bearing carrier cage 5 and by the bearing carrier 6. The containment can 10 hermetically seals off a chamber 12, which is enclosed by said containment can, with respect to the interior space 11.

An impeller shaft 13 which is rotatable about an axis of rotation A extends from a flow chamber 14, which is delimited by the hydraulics casing 3 and by the casing cover 4, into the chamber 12 through an opening 15 provided in the casing cover 4.

An impeller 16 is fastened to a shaft end, situated within the flow chamber 14, of the impeller shaft 13, and an inner rotor 17 arranged within the chamber 12 is arranged on the opposite shaft end, which has two shaft sections 13a, 13b with increasing diameters in each case. The inner rotor 17 is equipped with multiple magnets 18 which are arranged on that side of the inner rotor 17 which faces toward the containment can 10.

Between the impeller 16 and the inner rotor 17 there is arranged a plain bearing arrangement 19 which is operatively connected to the impeller shaft 13, which can be driven in rotation about the axis of rotation A.

A drive motor, preferably an electric motor, which is not illustrated drives a drive shaft 20. The drive shaft 20, which can be driven about the axis of rotation A, is arranged substantially coaxially with the impeller shaft 13. The drive shaft 20 extends through the bearing cover 7 and through the bearing carrier 6 and is mounted in two ball bearings 21, 22 which are accommodated in the bearing carrier 6. On the free end of the drive shaft 20 there is arranged an outer rotor 24, which bears multiple magnets 23. The magnets 23 are arranged on that side of the outer rotor 24 which faces toward the containment can 10. The outer rotor 24 extends at least partially over the containment can 10 and interacts with the inner rotor 17 such that the rotating outer rotor 24, by way of magnetic forces, sets the inner rotor 17 and thus likewise the impeller shaft 13 and the impeller 16 in rotation.

Figure 2:
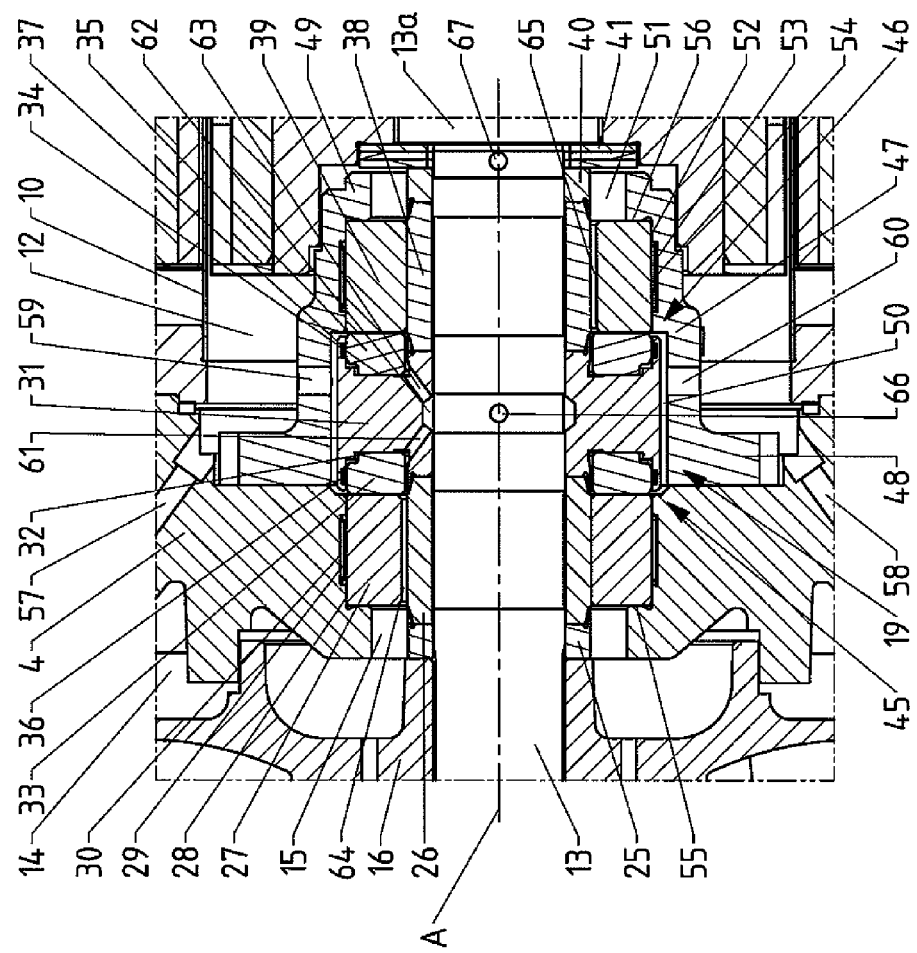
FIG. 2 shows a plain bearing arrangement corresponding to FIG. 1 in an enlarged illustration.

The plain bearing arrangement 19 illustrated on an enlarged scale in FIG. 2 comprises a first retaining ring 25, which is arranged on the impeller shaft 13 and which bears by way of one side against the impeller 16. A first bearing sleeve 26, which has likewise been pushed onto the impeller shaft 13, bears against that side of the retaining ring 25 which is situated opposite the impeller 16. The first bearing sleeve 26 is surrounded by a first bearing bushing 27, which is connected non-rotationally to the casing cover 4. The first bearing sleeve 26, which is situated close to the impeller 16, and the first bearing bushing 27, which is situated close to the impeller 16, are in this case arranged entirely, or at least partially or predominantly, in the opening 15 of the casing cover 4. The opening 15 of the casing cover 4 has an opening region 28 of increased diameter, in which opening region there is formed an encircling groove 30 which receives a tolerance ring 29, wherein the bearing bushing 27 positioned in the opening region 28 is connected non-rotationally to the casing cover 4 in a secure manner by way of the tolerance ring 29.

A second retaining ring 31, which has been pushed onto the impeller shaft 13, bears against that side of the bearing sleeve 26 which is situated opposite the retaining ring 25. In the retaining ring 31 there is formed a first ring groove 32 which points toward the first bearing bushing 27 and in which a first axial bearing ring 33 is arranged. The first bearing bushing 27 and first axial bearing ring 33 are arranged so as to be situated substantially opposite one another. On the side situated opposite the first ring groove 32, the retaining ring 31 has a second ring groove 34 in which a second axial bearing ring 35 is accommodated. In the embodiment shown, the retaining ring 31 is of single-part form. In an alternative embodiment, the retaining ring 31 may be formed in two parts, wherein both retaining ring parts have in each case only one ring groove 32 and 34 respectively. The first axial bearing ring 33 is clamped in the first ring groove 32 by way of an undular washer 36. In the same way, the second axial bearing ring 35 is clamped in the second ring groove 34 by way of a further undular washer 37.

A second bearing sleeve 38 arranged on the impeller shaft 13 bears against that side of the retaining ring 31 which is situated opposite the first bearing sleeve 26, and said second bearing sleeve is surrounded by a second bearing bushing. The second bearing bushing 39 and second axial bearing ring 35 are arranged so as to substantially face one another. A third retaining ring 40, which has been pushed onto the impeller shaft 13, bears, at the side facing away from the retaining ring 31, against the second bearing sleeve 38.

As can be seen from FIGS. 1 and 2, the plate spring pack 41 is arranged between the retaining ring 40 and the shaft section 13a and exerts a spring force on the clamped assembly composed of impeller 16, an impeller nut 43 which fastens the impeller 16 to the impeller shaft 13 via a disk 42, retaining ring 25, first bearing sleeve 26, retaining ring 31, second bearing sleeve 38, retaining ring 40 and inner rotor 17 in such a way that the clamped assembly is held in abutment, in particular by way of the inner rotor 17, with a certain degree of elasticity against an abutment surface 44 which arises owing to the different diameters of the shaft sections 13a and 13b, wherein the diameter of the shaft section 13b is greater than the diameter of the shaft section 13a and the diameter of the shaft section 13a is greater than the diameter of that part of the impeller shaft 13 which adjoins the shaft section 13a at the side facing away from the shaft section 13b. The clamped assembly comprises substantially the components which rotate with the impeller shaft 13 about the axis of rotation A.

Owing to differently acting axial thrust forces during the operation of the pump arrangement 1, either the first axial bearing ring 33 abuts against the first bearing bushing 27, wherein first axial bearing ring 33 and first bearing bushing 27 form a first axial bearing arrangement 45, or the second axial bearing ring 35 abuts against the second bearing bushing 39, wherein second axial bearing ring 35 and second bearing bushing 39 form a second axial bearing arrangement 46.

A bearing ring carrier 47 is fastened, coaxially with respect to the axis of rotation A, by way of a flange-like region 48 to the casing cover 4 by means of a screw connection (not illustrated), and said bearing ring carrier extends into the chamber 12. Here, said bearing ring carrier substantially surrounds the retaining ring 31 with the axial bearing rings 33, 35, the second bearing sleeve 38, the second bearing bushing 39 and, at least in part, the retaining ring 40. From the flange-like region 48 to its free end 49, the outer diameter of the bearing ring carrier 47 decreases in sections. The bearing ring carrier 47 has an interior region 50 within which the retaining ring 31 is arranged. On the free end 49, the bearing ring carrier 47 has an opening 51 through which the impeller shaft 13 extends, which opening has an opening region 52 of increased diameter situated adjacent to the interior region 50, in which opening region there is formed an encircling groove 54 which receives a tolerance ring 53. The second bearing bushing 39, which is accommodated in the opening region 52, is connected rotationally conjointly to the bearing ring carrier 47 in a secure manner by way of the tolerance ring 53.

An abutment surface 55 is realized owing to the transition from the opening 15 to the opening region 28 of increased diameter, and an abutment surface 56 is realized owing to the transition from the opening 51 to the opening region 52 with increased diameter, which abutment surfaces hold the plain bearing arrangement 19 in its intended position.

Passage openings 57, 58 are provided in the casing cover 4, and passage openings 59, 60 are provided in the bearing ring carrier 47. The passage openings 57, 58 connect the flow chamber 14 to the chamber 12 which is substantially surrounded by the containment can 10 and the casing cover 4, and the passage openings 59, 60 connect the chamber 12 to the interior region 50 of the bearing ring carrier 47. In the retaining ring 31 there is formed at least one bore 61 which connects the first ring groove 32 to a further ring groove 62 which is formed in the retaining ring 31 in the region facing toward the impeller shaft 13. At least one bore 63 connects the second ring groove 34 likewise to the ring groove 62. Furthermore, at least one axial groove 64 running parallel to the axis of rotation is situated in the first bearing bushing 27 on the radial bearing surface which interacts with the first bearing sleeve 26, and an axial groove 65 is situated in the second bearing bushing 39 on the radial bearing surface which interacts with the second bearing sleeve 38.

Thus, for the cooling and lubrication of the plain bearing arrangement 19, delivery medium can be extracted from the flow chamber 14 and supplied via the passage openings 57, 58, 59, 60 to the axial bearing rings 33, 35 and to the mutually assigned surfaces of the bearing sleeves 26, 38 and bearing bushings 27, 39. Via the bores 61, 63, the delivery medium is delivered into the ring groove 62. Via at least one radial bore 66 formed in the impeller shaft 13, the delivery medium is delivered into an axial duct (not illustrated), which extends through the entire impeller shaft 13 from one end to the other, and then back into the flow chamber 14. If required, at least one further radial bore 67 is formed in the impeller shaft close to the retaining ring 40 or disk spring pack 41, which at least one further radial bore is likewise connected to the axial duct extending through the impeller shaft 13. Via at least one radial bore (not illustrated in the figures) in the retaining ring 40, the delivery medium is delivered from the interior region 50 of the bearing ring carrier 48 to the at least one radial bore 67. By virtue of the fact that the radial bores 66, 67 are arranged relatively far away from the impeller 16, greater fatigue strength of the impeller shaft 13 is realized.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE DESIGNATIONS

1 Pump arrangement
2 Pump casing
3 Hydraulics casing
4 Casing cover
5 Bearing carrier cage
6 Bearing carrier
7 Bearing cover
8 Inlet opening
9 Outlet opening
10 Containment can
11 Interior space
12 Chamber
13 Impeller shaft
13a Shaft section
13b Shaft section
14 Flow chamber
15 Opening
16 Impeller
17 Inner rotor
18 Magnet
19 Plain bearing arrangement
20 Drive shaft
21 Ball bearing
22 Ball bearing
23 Magnet
24 Outer rotor
25 Retaining ring
26 First bearing sleeve
27 First bearing bushing
28 Opening region
29 Tolerance ring
30 Groove
31 Retaining ring
32 First ring groove
33 First axial bearing ring
34 Second ring groove
35 Second axial bearing ring
36 Undular washer
37 Undular washer
38 Second bearing sleeve
39 Second bearing bushing
40 Retaining ring
41 Plate spring pack
42 Disk
43 Impeller nut
44 Abutment surface
45 First axial bearing
46 Second axial bearing
47 Bearing ring carrier
48 Flange-like region
49 Free end
50 Interior region
51 Opening
52 Opening region
53 Tolerance ring
54 Groove
55 Abutment surface
56 Abutment surface
57 Passage opening
58 Passage opening 59 Passage opening
60 Passage opening
61 Bore
62 Ring groove
63 Bore
64 Axial groove
65 Axial groove
66 Radial bore
67 Radial bore
A Axis of rotation

The invention claimed is:

1. A pump arrangement, comprising:
a pump casing having an interior space;
a containment can arranged to hermetically seal a chamber in the interior space;
an impeller shaft;
an impeller arranged on a impeller end of the impeller shaft;
an inner rotor arranged on an opposite end of the impeller shaft; and
a plain bearing arrangement arranged to support the impeller shaft in the pump casing, the plain bearing arrangement being located in a region of the impeller shaft between the impeller and the inner rotor and including
a first bearing sleeve connected non-rotationally to the impeller shaft,
a second bearing sleeve connected non-rotationally to the impeller shaft,
a first bearing bushing connected non-rotationally to the pump casing or to a first component fastened to the pump casing, the first bearing bushing being arranged to interact by way of a first radial bearing surface with the first bearing sleeve,
a second bearing bushing connected non-rotationally to the pump casing or to a second component fastened to the pump casing, the second bearing bushing being arranged to interact by way of a second radial bearing surface with the second bearing sleeve, and
a retaining ring arranged between the first and second bearing bushings,
wherein
a first ring groove arranged to receive a first axial bearing ring is formed in the retaining ring on a face side facing toward the first bearing bushing,
a second ring groove arranged to receive a second axial bearing ring is formed in the retaining ring on a face side facing toward the second bearing bushing,
the first bearing sleeve and the first bearing bushing are arranged in an opening of a casing cover located at least in part between the impeller and the plain bearing arrangement,
the first axial bearing ring is clamped in the first ring groove by a first circumferential undular washer,
the second axial bearing ring is clamped in the second ring groove by a second circumferential undular washer, and
a spring pack between the second bearing sleeve and the inner rotor is arranged to axially bias the second bearing sleeve toward the impeller end of the impeller shaft.

2. The pump arrangement as claimed in claim 1, wherein the retaining ring includes at least one impeller-side bore arranged to connect the first ring groove to a further ring groove in the retaining ring in a region of the retaining ring facing toward the impeller shaft.

3. The pump arrangement as claimed in claim 2, wherein the retaining ring includes at least one bore on a side opposite the impeller-side arranged to connect the second ring groove to the further ring groove.

4. The pump arrangement as claimed in claim 3, wherein an opening in the casing cover has an opening region of increased diameter, the opening region including an encircling groove arranged to receive a first tolerance ring, and
the first bearing bushing is located in the opening region and connected non-rotationally to the casing cover by the tolerance ring.

5. The pump arrangement as claimed in claim 4, wherein an opening in a bearing ring carrier located on a side of the plain bearing arrangement opposite the impeller-side has an opening region of increased diameter including an encircling groove arranged to receive a second tolerance ring, and
the second bearing bushing is located in the opening region and connected non-rotationally to the bearing ring carrier by the tolerance ring.

* * * * *